UNITED STATES PATENT OFFICE.

LEONARD PAGET, OF NEW YORK, N. Y., ASSIGNOR TO THE MACRAEON STORAGE BATTERY COMPANY, OF SAME PLACE.

SECONDARY BATTERY.

SPECIFICATION forming part of Letters Patent No. 393,575, dated November 27, 1888.

Application filed August 8, 1888. Serial No. 282,272. (No specimens.)

*To all whom it may concern:*

Be it known that I, LEONARD PAGET, a citizen of the United States, residing in New York, county of New York, and State of New York, have made a new and useful invention in Secondary or Storage Batteries, of which the following is a specification.

My invention relates to that class of storage-batteries in which the active material or material to become active is applied to a support, grid, or frame prior to subjecting such material to the action of the charging-current of electricity; and its objects are, first, to so unite the active material or material to become active with the support, plate, grid, or frame that the electrode when in use will not buckle; second, to so unite the active material or material to become active with the support, plate, grid, or frame that it will not during the use of the electrode "strip," scale off, or disintegrate, thereby avoiding destruction of such electrode. "Buckling" is caused by unequal electro chemical action over the surfaces of the electrode, thereby causing different degrees of expansion; or it may be caused by the expansion of the active material and non-expansion of the sustaining-frame. "Stripping" or falling off of the active material is the result of unequal expansion of the active material and support, together with the insufficiency of coherence between said parts.

The active material to which I refer is usually an oxide of lead made into a paste, with water acidulated or otherwise, and then mechanically applied to the grid, frame, or support, after which it is allowed to dry, and is then ready for charge. Under the action of the charging-current this paste swells, and there results both the buckling and stripping above referred to—features which my improvement is designed to avoid.

This present application is limited to my novel method or process of preparing storage or secondary battery electrodes, and the article so made constitutes the subject-matter of an additional application, bearing Serial No. 282,273, filed of even date herewith.

The objects above noted are accomplished by the electrode constructed by the process hereinafter described, and particularly pointed out in the claims which follow this specification.

I take a support for the active material or material to become active of any desired form, preferably that form covered by the divisional application above referred to, in which said support is so constructed as to admit freely of expansion in all directions with the active material or material to become active as it expands while in action, and I cast upon this support a mass of the active material or material adapted to become active. This material is composed of a molten mass of a salt or lead oxide united with a suitable flux, consisting, preferably, of a molten mass of fused chloro-carbonate of lead, although I obtain good results with litharge fused with potash or niter. When this mass of material is fused and thoroughly incorporated, I dip the support or frame into it, after the manner of dipping candles, and then remove it. This operation is repeated after the molten material has cooled on the surface of the support or frame, and so on successively until the coating of active material or material to become active has reached the desired thickness. I may place the support or frame in a mold, after the manner of candle-molding, and pour the molten mass about it. After this mass has cooled sufficiently to adhere to the support it may be removed, in which condition it constitutes the completed electrode, ready as an article of manufacture for sale and use. It can be connected up in the usual manner with other electrodes, and is ready for charging and use.

By the methods here indicated I produce absolute and perfect adherence between the active material or material to become active and the conducting-support, which may be of lead or any other desired well-known substance used for frames or supports to the active material in storage-batteries. I find, also, that the peroxide, which results after charging an electrode so constructed, is very free from scaling or stripping, but particularly when applied to the special form of expansible support named in the application above referred to. I also find that the conductivity between the material so deposited and its support is very materially increased, and that the molten salt used is much more easily peroxidized than in any existing form of electrode to me known.

I desire it to be understood that this application is directed, broadly, to the process or method described and claimed without limiting myself to the specific materials used in practicing the same or any specific form of support or frame.

I am aware that it is broadly old to unite the active material to a support or frame in a secondary or storage battery by "welding" or "casting" the two together—that is to say, by forming a union of the two at their adjoining faces—and I do not therefore desire it to be understood that my claims comprehend such a process or method; but What I do claim, and desire to secure by Letters Patent of the United States, is—

1. The within-described method or process of preparing an electrode for use in a secondary or storage battery, which consists in fusing the active material or material to become active, then immersing the frame or support in said fused mass, and finally allowing the whole to cool, whereby the active material or material to become active is firmly united to the frame or support, substantially as described.

2. The within-described method or process of preparing an electrode for use in a secondary or storage battery, which consists, first, in mixing the active material or material to become active with a flux; second, melting said mixture, and, third, immersing the support or frame in said molten mass and allowing the whole to cool, substantially as described.

3. The within-described process of preparing an electrode for use in a secondary or storage battery, which consists in first fusing the active material or material to become active, then immersing the support for said material in this molten mass, and then removing it and allowing the whole to cool, repeating the operation till the coating of such material has assumed the desired thickness, substantially as described.

4. The within-described method or process of preparing an electrode for use in a secondary or storage battery, which consists in first mixing the active material or material to become active with a flux; second, melting or fusing said mixture, and, third, immersing the support or frame for holding said material in this molten mass and then removing it and allowing the whole to cool, repeating the action until the coating of the material upon the support has attained the desired thickness, substantially as described.

LEONARD PAGET.

Witnesses:
 FRANCIS HOW,
 J. F. QUINN.